PULSE CODE TO ALPHA/NUMERIC TRANSLATOR

Filed Nov. 1, 1966 10 Sheets-Sheet 1

INVENTORS
ALFRED W. ZINN
SOL GRUBER
BY George B. Oujevolk
ATTORNEY

PULSE CODE TO ALPHA/NUMERIC TRANSLATOR

Filed Nov. 1, 1966 10 Sheets-Sheet 2

INVENTORS
ALFRED W. ZINN
SOL GRUBER
BY
ATTORNEY

PULSE CODE TO ALPHA/NUMERIC TRANSLATOR

INVENTORS
ALFRED W. ZINN
SOL GRUBER
BY
ATTORNEY

INVENTORS
ALFRED W. ZINN
SOL GRUBER
BY George B. Oujevolk
ATTORNEY

INVENTORS
ALFRED W. ZINN
SOL GRUBER

BY

George B. Oujevolk

ATTORNEY

INVENTORS
ALFRED W. ZINN
SOL GRUBER
BY George B. Oujevolk
ATTORNEY

PULSE CODE TO ALPHA/NUMERIC TRANSLATOR

Filed Nov. 1, 1966

TABLE 2

NUMERIC CHARACTER FORMATION

DOT NUMBER SECTION

| DOT NUMBER | | | | | | | | | | | | |
|---|---|---|---|---|---|---|---|---|---|---|---|---|
| 1 | - | O | - | - | - | - | - | - | - | - | O | O |
| 2 | - | O | - | - | O | - | O | - | - | - | O | O |
| 3 | - | - | - | - | O | - | O | - | - | - | - | O |
| 4 | - | O | - | - | O | - | O | - | - | - | O | O |
| 5 | - | O | - | - | - | - | O | - | - | - | O | O |
| 6 | - | O | O | O | - | - | - | O | - | - | O | O |
| 7 | O | O | O | O | O | O | O | O | O | O | O | O |
| 8 | O | - | O | O | O | O | O | O | O | O | - | O |
| 9 | O | O | O | O | O | O | O | O | O | O | O | O |
| 10 | - | O | - | - | - | O | O | - | - | - | O | O |
| 11 | - | O | - | - | - | - | - | O | - | - | - | - |
| 12 | O | O | - | - | - | - | - | O | - | - | - | - |
| 13 | O | - | - | - | - | - | - | O | - | - | - | - |
| 14 | O | O | - | - | - | - | - | O | - | - | - | - |
| 15 | - | O | - | - | - | - | - | - | - | - | - | - |
| 16 | - | O | - | O | O | O | - | O | - | O | O | O |
| 17 | O | O | O | O | O | O | O | O | O | O | O | O |
| 18 | O | - | O | O | O | O | O | O | O | O | - | O |
| 19 | O | O | O | O | O | O | O | O | O | O | O | O |
| 20 | - | O | O | - | - | - | - | - | - | - | O | O |
| 21 | - | O | - | - | O | - | - | O | - | O | O | O |
| 22 | - | O | - | - | O | - | - | O | - | O | O | O |
| 23 | - | - | - | - | O | - | - | O | - | O | - | O |
| 24 | - | O | - | - | O | - | - | O | - | O | O | O |
| 25 | - | O | - | - | - | - | - | - | - | - | O | O |

FIG. 5

| | | 0 | 1 | 2 | 3 | 4 | 5 | 6 | 7 | 8 | 9 | + | - |
|---|---|---|---|---|---|---|---|---|---|---|---|---|---|
| $2^0$ | A | O | - | O | - | O | - | O | - | O | - | O | - |
| $2^1$ | B | O | O | - | - | O | O | - | - | O | O | - | - |
| $2^2$ | C | O | O | O | O | - | - | - | - | O | O | O | O |
| $2^3$ | D | O | O | O | O | O | O | O | O | - | - | - | - |

| | | | | |
|---|---|---|---|---|
| 1 | . | . | . | 5 |
| 6 | . | . | . | 10 |
| 11 | 12 | 13 | 14 | 15 |
| . | . | . | . | 20 |
| . | . | . | . | 25 |

FIG. 5a

| | | | | |
|---|---|---|---|---|
| . | . | 3 | . | . |
| . | . | 8 | . | . |
| 11 | 12 | 13 | 14 | 15 |
| . | . | 18 | . | . |
| . | . | 23 | . | . |

FIG. 5b

INVENTORS
ALFRED W. ZINN
SOL GRUBER

BY George B. Oujevolk
ATTORNEY

INVENTORS
ALFRED W. ZINN
SOL GRUBER
BY [signature]
ATTORNEY

INVENTORS
ALFRED W. ZINN
SOL GRUBER
BY George B. Oujevolk
ATTORNEY

PULSE CODE TO ALPHA/NUMERIC TRANSLATOR

Filed Nov. 1, 1966 10 Sheets-Sheet 10

INVENTORS
ALFRED W. ZINN
SOL GRUBER
BY
George B. Oujevolk
ATTORNEY

United States Patent Office 3,518,657

Patented June 30, 1970

3,518,657

PULSE CODE TO ALPHA/NUMERIC TRANSLATOR

Alfred W. Zinn, Monsey, N.Y., and Sol Gruber, North Caldwell, N.J., assignors to Singer-General Precision, Inc., a corporation of Delaware Filed Nov. 1, 1966, Ser. No. 591,185

Int. Cl. G06f *5/00*

U.S. Cl. 340—324 12 Claims

ABSTRACT OF THE DISCLOSURE

The computer provides two signals to the logic system, a staircase saw tooth waveform, and a BCD data stream. The staircase waveform is converted into a first stream of clock pulses and fed to a shift register for clocking in the BCD data one line at a time. The data line is then parallel shifted into a second register and a second clock is simultaneously enabled. The data in the second register is made available to a decoder which contains suitable logic circuitry for converting the BCD information into alpha/numeric data which, in turn, is used to intensify the appropriate spots in a $P \times Q$ dot matrix on the face of a CRO. In order to provide an intensify signal or a not intensify signal for each dot position in the matrix, additional gating signals are applied to the decoder from a dot sequence generator which receives its timing signals from the second clock. In the time it takes to load the shift register with a single BCD line, the second clock pulses $P \times Q$ times to generate a complete character raster on the CRO. The intensified dots in the raster thus form a display of the alpha/numeric character corresponding to the BCD data line in the second register.

The present invention relates to the conversion of a chain of pulses to an alpha/numeric signal and more particularly to the supplying of alpha/numeric information in aerial photography.

In connection with the flight photos taken by a camera from a space vehicle or aircraft, it is important to identify the individual views taken. Thus, such information may consist of the height of the craft, latitude, longitude, time of the photo, compass orientation of the camera, etc. At present, this information in analog form is fed to a computer known as ASQ–90. This computer is described in a publication distributed by the Bureau of Naval Weapons and the Secretary of the Air Force, titled (Navy) NAVWEPS 16–30ASQ90–1 (USAF) T.O. 10A10–3–2 Technical Manual Intermediate (Field) Maintenance Instructions Data Display Set AN/ASQ90, Dec. 15, 1965. This computer in turn provides a chain of pulses to a cathode ray tube (CRT). The information is displayed on the tube as a group of dots in binary coded decimal (BCD) form. These dots are photographed together with the main objective with a second set of optics on the edge of the flight photo as a group of small BCD dots. With the aid of a magnifying glass, these dots can be seen. Although these dots can also be read as BCD information, such reading is no pleasant task, and, in fact, is much more difficult than translating Morse code, which at least consists of dots and dashes. When several hundred photo frames have to be read, the task is extremely tedious.

Thus, one of the principal objects of the present invention is to provide a system for translating a stream of pulses used to provide BCD information into an alpha/numeric signal corresponding to the BCD information.

Figure 1A:
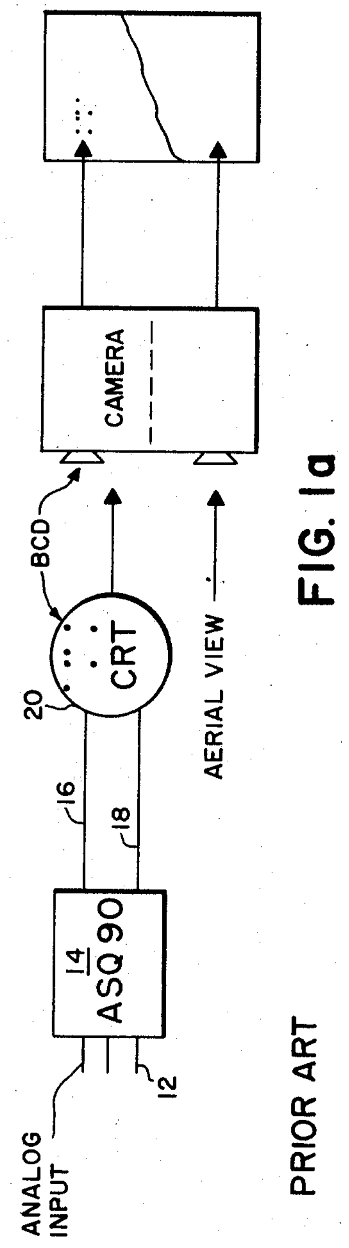
FIG. 1a PRIOR ART
Figure 1B:
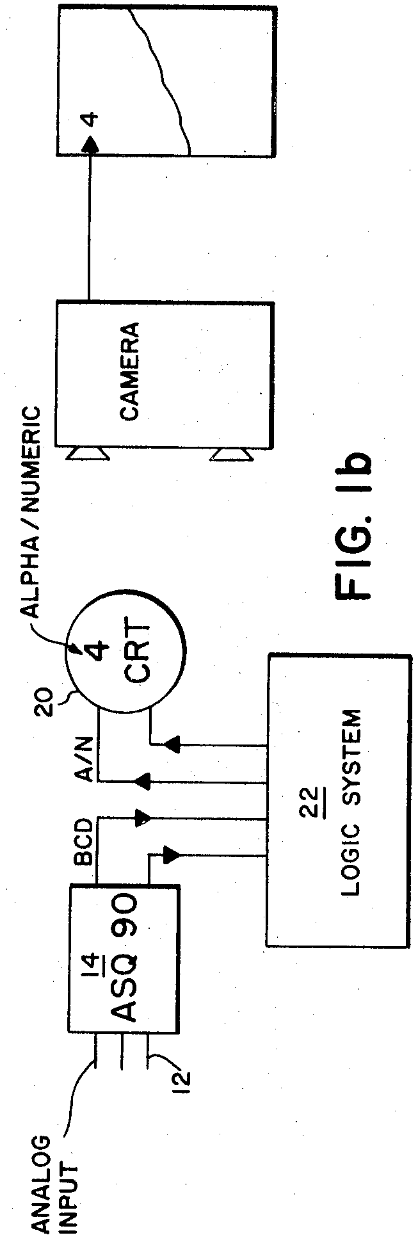
Figure 1C:
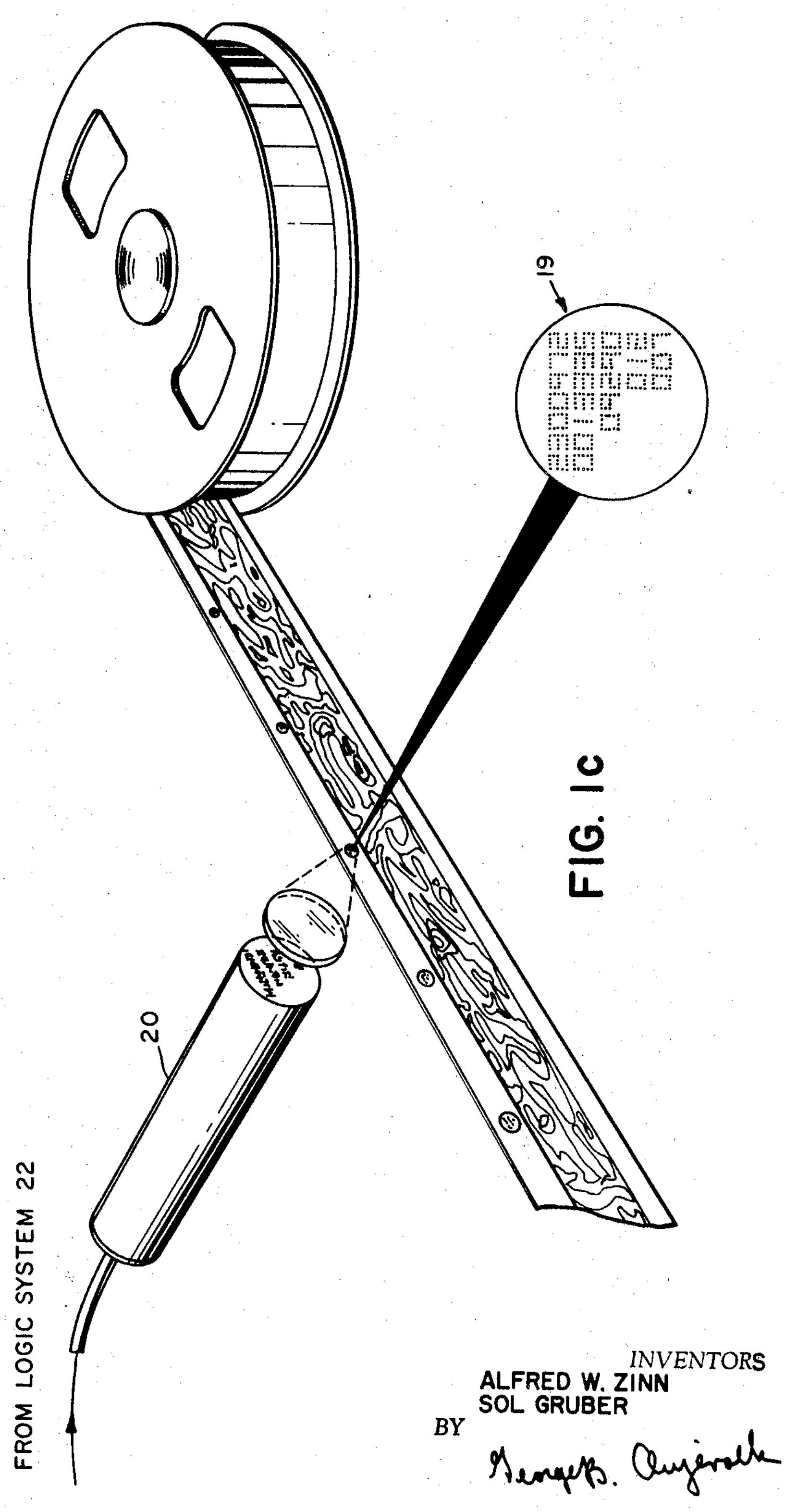
Figure 3:
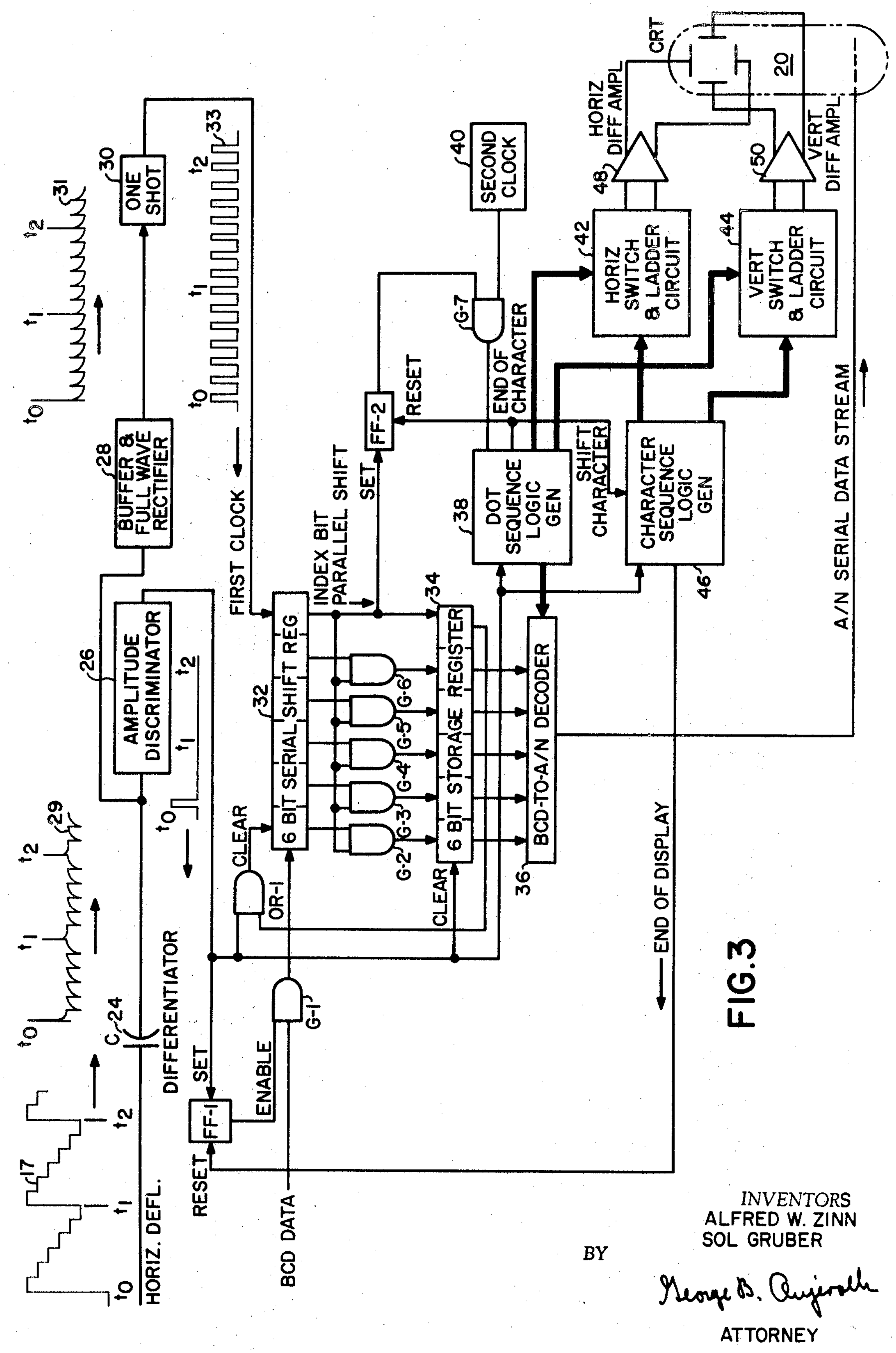
Figure 4:
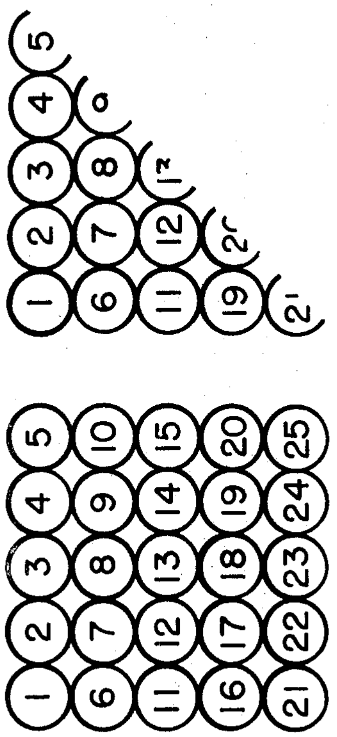
Figure 4A:
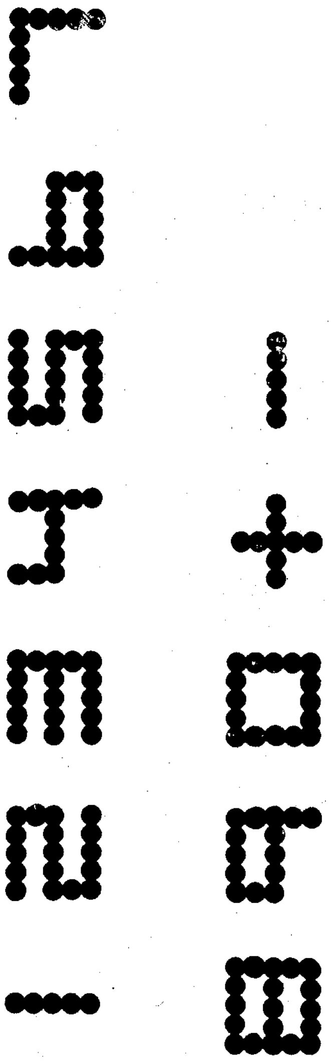
Figure 6B:
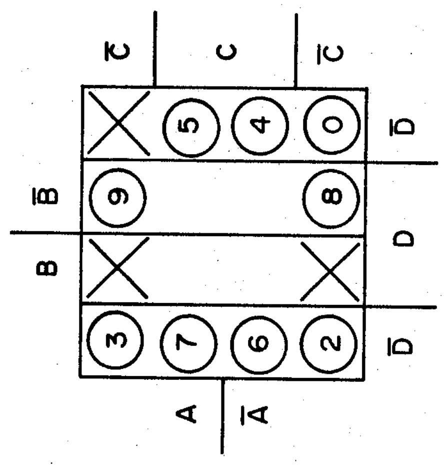
Figure 6C:
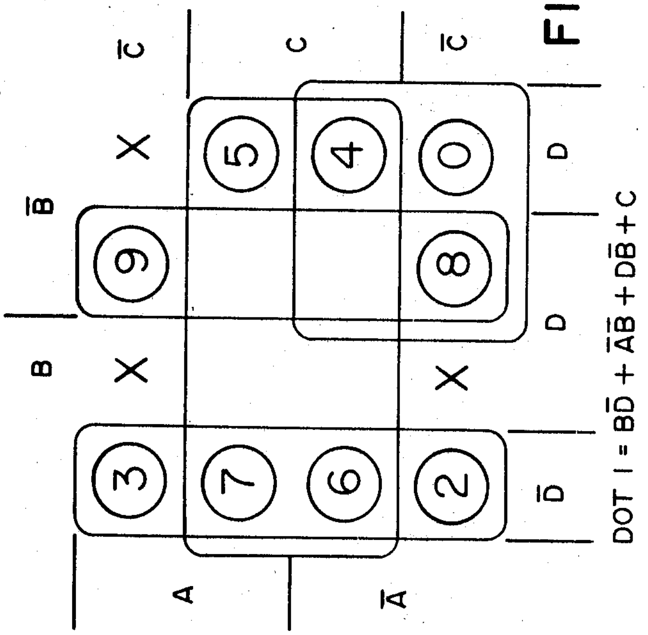
Figure 6A:
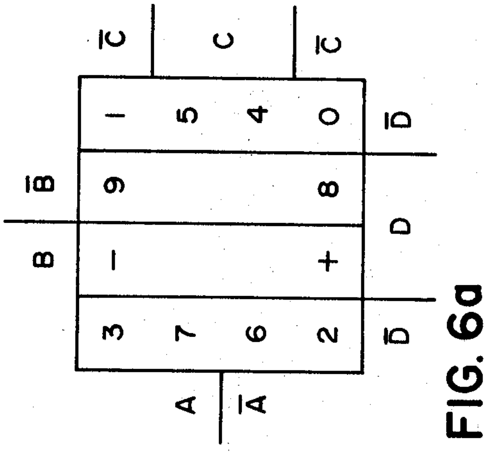
Figure 7:
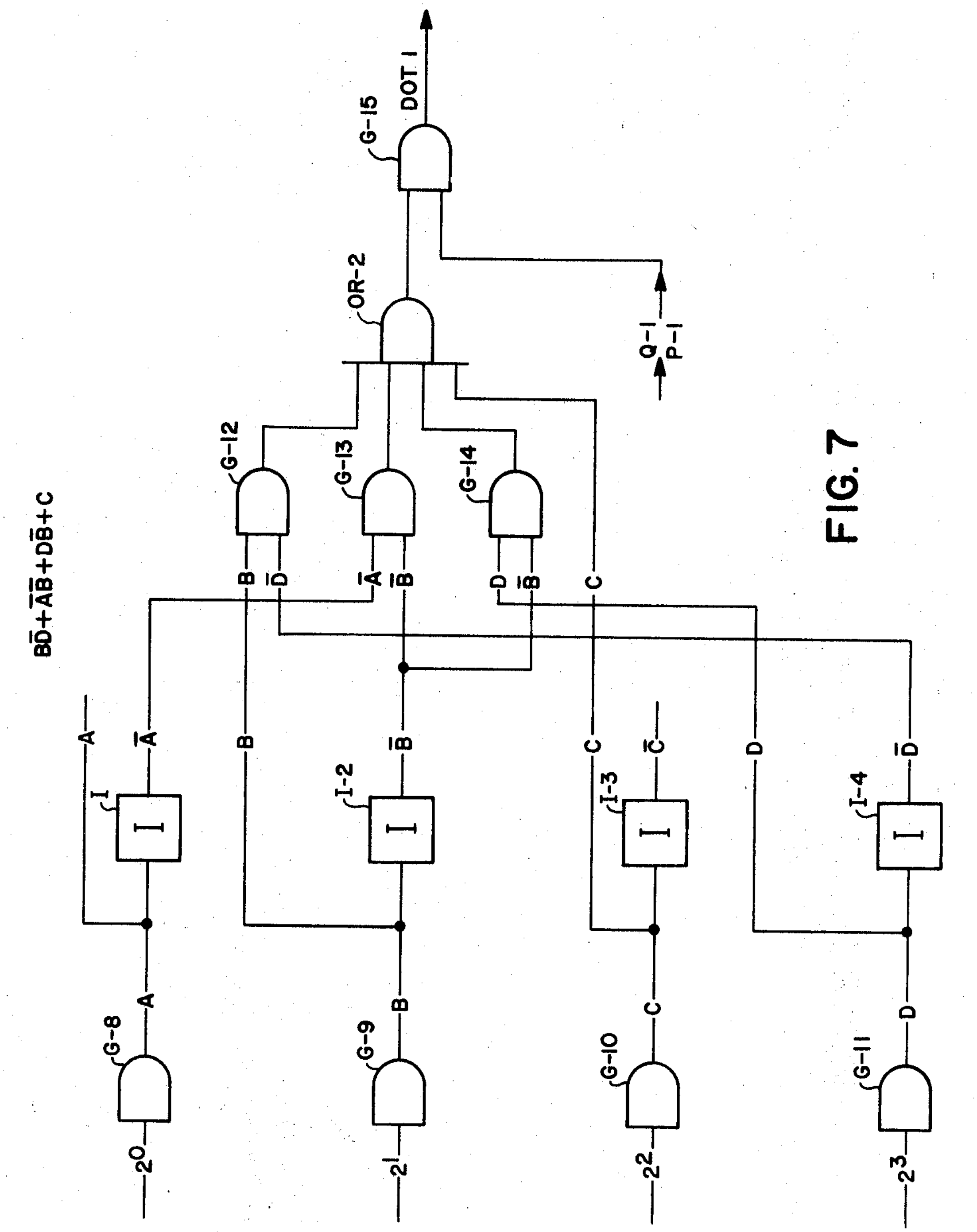
Figure 8:
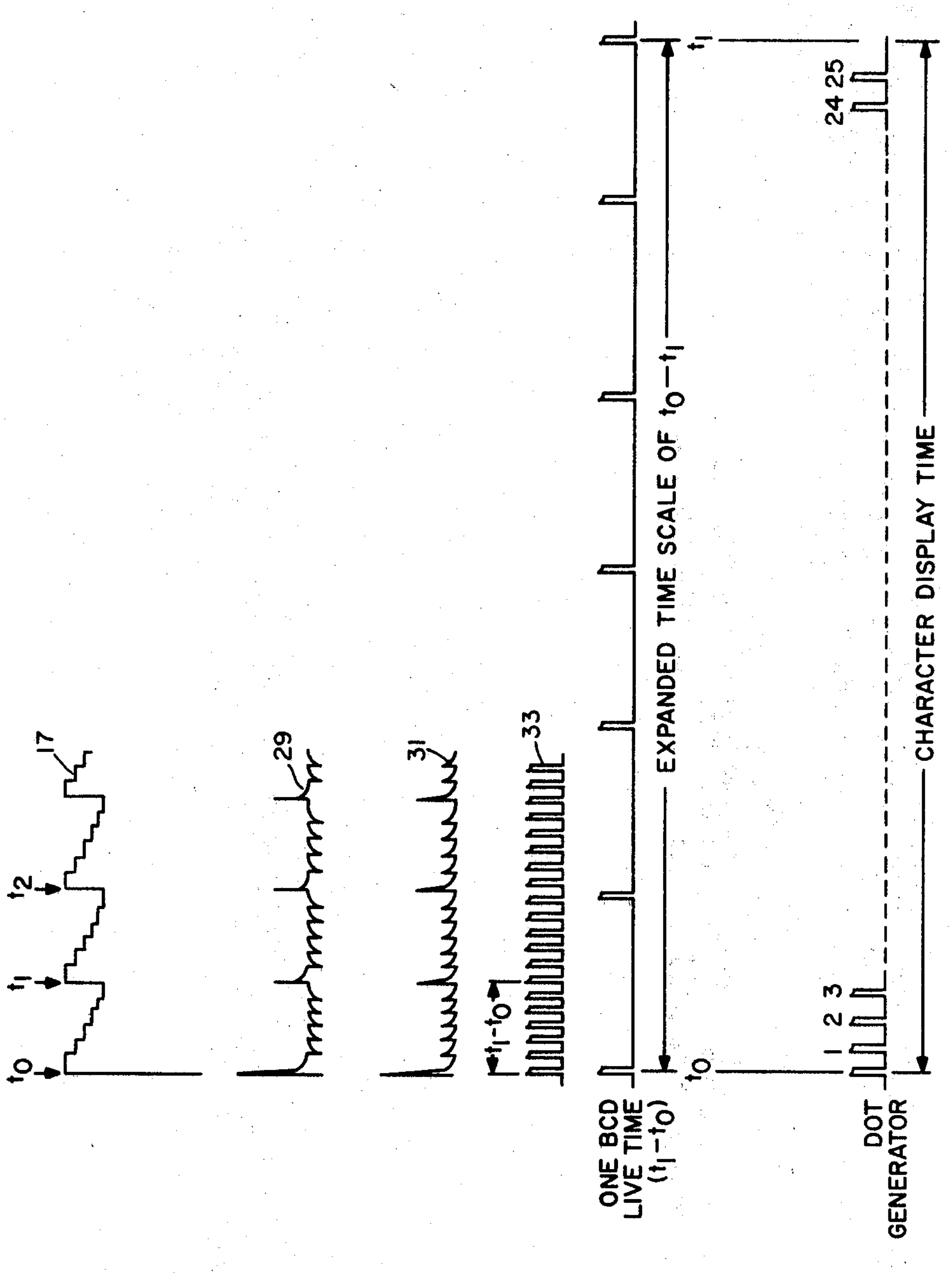

The invention as well as other objects and advantages thereof will become more readily apparent from the following detailed description when taken in conjunction with the accompanying drawing, in which:

FIG. 1*a* is a block diagram of a system of the prior art;

FIG. 1*b* shows in block diagram the system contemplated herein;

FIG. 1*c* is a perspective representation of the results obtained using the system of FIG. 1*b*;

FIGS. 2*a*, 2*b*, 2*c*, 2*d*, and 2*e* are waveform diagrams showing the various signal waveforms used in the present invention;

FIG. 3 presents partly in schematic and partly in block diagram the system contemplated herein;

FIG. 4 represents a block of data used in the present invention to provide alpha/numeric information;

FIG. 4*a* illustrates the alpha/numeric information provided by the data block of FIG. 4;

FIG. 5 is a work chart used in designing the system herein described;

FIGS. 5*a* and 5*b* show the position information obtained from the work chart of FIG. 5;

FIG. 6*a* is an example of a logic diagram useful in the design of the present invention;

FIG. 6*b* shows the use of the logic diagram of FIG. 6*a* to define a location in the data block of FIG. 4;

FIG. 6*c* uses the logic diagram of FIG. 6*b* to obtain a logic equation corresponding to the defined location;

FIG. 7 is a schematic circuit diagram corresponding to the equation obtained in FIG. 6*c*; and FIG. 8 is a wave ratio diagram illustrating the ratio of the frequency of waves containing input information to the waves used to display the information in the data block of FIG. 4.

At the outset, it is advantageous to set down the BCD information which will be translated into alpha/numeric symbols. The code used with the usual computer is set forth in Table 1.

TABLE 1

| Alpha/numeric symbol | Raster (line) dot | "Eight" dot | "Four" dot | "Twot" do | "One" dot | Parity dot |
|---|---|---|---|---|---|---|
| 0 | • | | | | | • |
| 1 | • | | | | • | |
| 2 | • | | | • | | |
| 3 | • | | | • | • | • |
| 4 | • | | • | | | |
| 5 | • | | • | | • | • |
| 6 | • | | • | • | | • |
| 7 | • | | • | • | • | |
| 8 | • | • | | | | |
| 9 | • | • | | | • | • |
| + | • | • | | • | | • |
| − | • | • | | • | • | |

The analog information (FIG. 1*a*) shown as number 12, enter the computer 14, i.e., an ASQ–90, and is converted into two outputs 16 and 18 providing first, a stream of pulses 15 (FIG. 2*e*) corresponding to the BCD information, and second, a series of saw tooth waves 17 (FIG. 2*a*) representing the lines and columns. The second output, i.e., the saw tooth wave, is presently applied to the horizontal deflection plates of the cathode ray tube 20 to determine the beam position, while the stream of pulses are applied to the grid of tube 20 to determine the beam intensification. Each step 21 in waveform 17 corresponds to a pulse of pulse stream 15. At the end of the line 23 there is a negative signal to start the next line. At the end of the data block 25 there is a retrace pulse 27 which is longer in time than every other signal since it goes from the end of the data back to the beginning to supply the first dot of the data block for the next photo.

In the present invention (FIG. 1*b*) the output of the computer 14 does not go to the cathode ray tube 20 as described in connection with FIG. 1*a*, but instead goes through a logic system 22 which in turn will display, not the dots which are not satisfactory, but alpha/numeric information. This logic system 22 is then to convert the output from the ASQ–90 into this alpha/numeric information, as shown, for example, at 19 in FIG. 1*c* which is subsequently recorded in a known manner on the margin of a corresponding photo frame.

Figures 2A, 2B, 2C, 2D:
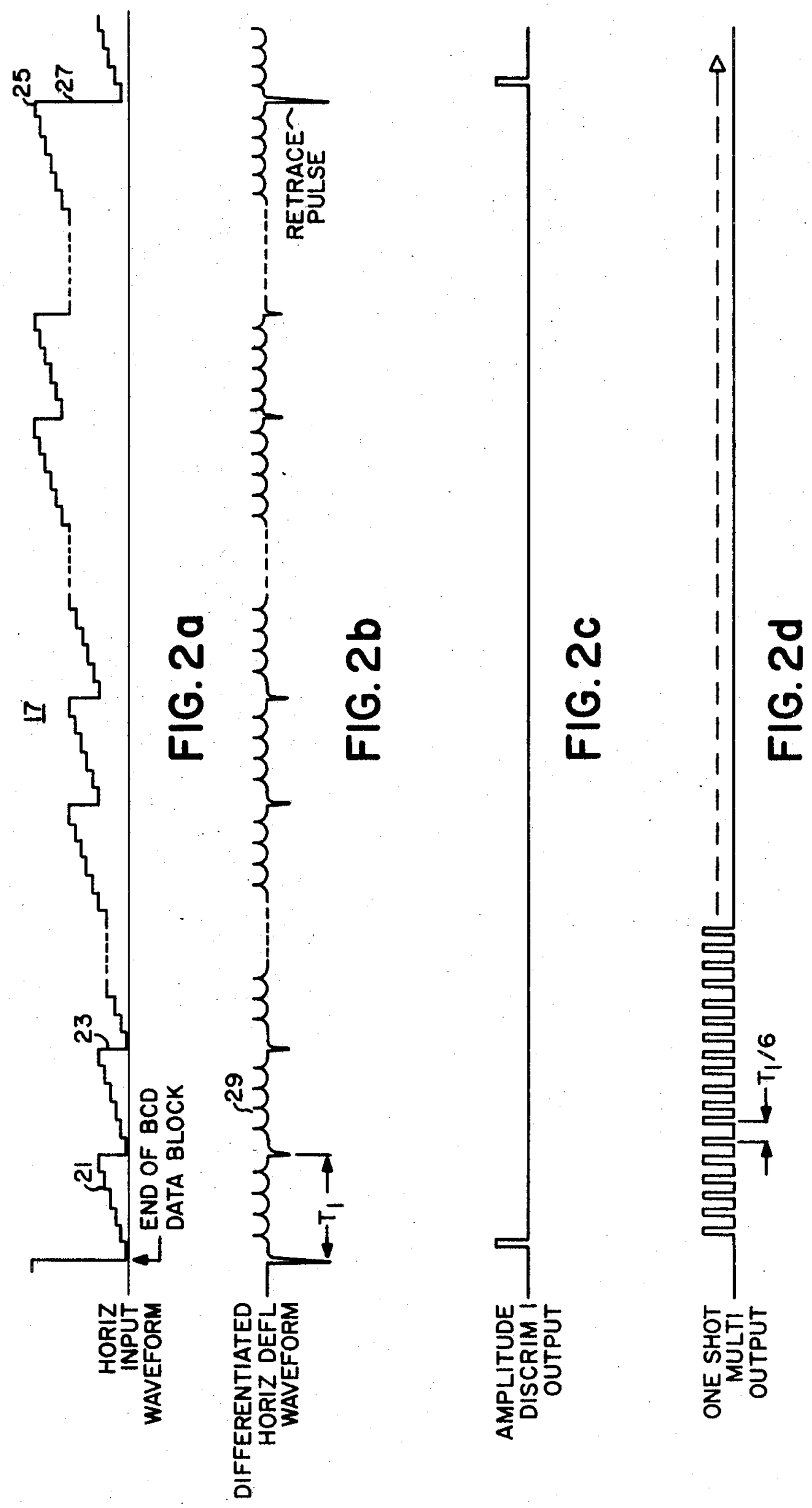
Figure 2E:
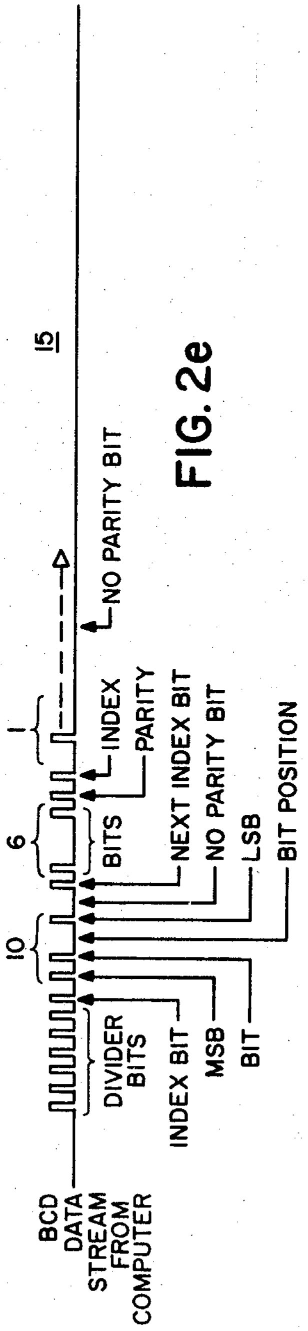

Looking now at FIGS. 2*a–e* and 3, the output from the computer consists of a first stream of BCD pulses which appear as rectangular waves (FIG. 2*e*) and a series of staircase saw tooth waves (FIG. 2*a*). Each step in the staircase corresponds to a pulse position. The staircase saw tooth waves 17 are first applied to a capacitor 24 shown in FIG. 3 for converting the saw tooth staircase waves into a differentiated horizontal deflection waveform 29 shown in FIG. 2*b*. Thus, the staircase disappears and instead, a series of saw tooth waves are produced. After each fifth tooth is a negative, end-of-line pulse tooth. At the end of the data block is a retrace pulse tooth which is substantially larger than all other pulses.

According to the present invention concept, the differentiated waveform is fed into an amplitude discriminator 26, which only allows the data block retrace pulse $t_0$ to pass so as to set the first flip-flop FF–1 as may best be seen in FIG. 3.

At the same time that horizontal waveform 17 is differentiated by capacitor 24, and fed through amplitude discriminator 26 to set flip-flop FF–1, the differentiated wave is full wave rectified in buffer amplifier and full wave rectifier 28 so as to assume waveform 31 (FIG. 3) and pulse height standardized to waveform 33 by a multivibrator "one-shot" 30 acting as a first clock which clocks in the BCD data. BCD data is accepted when the amplitude discriminator output at $t_0$ sets FF–1, thus enabling AND gate G–1. Also at the same time, a six bit serial shift register 32 is cleared by the $t_0$ pulse at flip-flop FF–1 which also passes through OR gate OR–1. This register is now filled with the incoming BCD data i.e., pulses $t_0+1$, $t_0+2$ . . . etc. Since every line of the BCD code matrix block consists of six bits of information beginning with an index bit and is then followed by four bits of data plus a parity bit used as a correct check feature, when the index bit reaches the sixth and last storage bit of the register, it parallel shifts all the bits to the six bit storage register 34 by enabling AND gates G–2 through G–6. At this time the sixth bit of the parallel storage register clears the serial shift register 32 so that it can accept the next line of BCD data. The data in storage register 34 is then presented to a binary coded decimal to alpha numeric (BCD to A/N) decoder 36. A dot sequence generator 38 is driven by a second clock 40 through AND gate G–7 which is enabled by flip-flop FF–2, which in turn is set by the previous index bit from six bit serial shift register 32.

One output of the dot sequence generator 38 drives the decoder which provides the alpha/numeric serial data which intensifies the CRT at the appropriate time to form the proper alpha/numeric character corresponding to the BCD data.

The other two outputs of the dot sequence generator 38 provide the proper logic for the horizontal and vertical switch and ladder circuits 42 and 44 which in turn position the CRT beam before it is intensified by the alpha/numeric data stream.

At the end of the dot sequence, an "end of character" pulse resets flip-flop FF–2, thus preventing the second clock 40 from recycling the dot sequence generator 38 until the next line of BCD information is ready for display.

The end of character pulse is also used to shift the character sequence generator 46 which provides the character positioning logic for the horizontal and vertical switch and ladder circuits 42 and 44.

Horizontal and vertical differential amplifiers 48, 50 are then used to amplify the ladder signals to drive the CRT deflection plates.

From the foregoing brief description, it is apparent that the staircase waveform 17 is converted back to clock pulses 33 after passing through stages 29 and 31. These clock pulses 33 are in synchronism with the incoming data stream 15. Both of these sets of pulses are then applied to the six-bit serial shift register to set the proser flip-flops. Thus, the index bit pulse is always set. This is the first pulse to enter the register and therefore enables the sixth flip-flop. Thus, as indicated in Table 1, for a "0" only the first flip-flop for the parity bit will be enabled. For a "1," the second and sixth flip-flops will be enabled, for a "2," the third and sixth flip-flops will be enabled, for three, the parity or first flip-flop, second, third and sixth flip-flops will be enabled, etc. When the index bit enables its sixth flip-flop, the pulses stored in the register are passed through individual gates (G–2 to G–6) to the six bit storage register. As this point, for the purpose of the present description, the parity bit may be disregarded since this is only a correct self-check feature.

As had just been mentioned, there are a plurality of BCD signals acting on decoder 36 from the six-bit storage register 34, which have first passed through gated G–2 to G–6, and the problem is to display these BCD signals as alpha/numeric signals on cathode ray tube 20.

These signals are to be formed from twenty-five dot matrices shown in FIG. 4. Each matrix then is to form individual numbers depicted in FIG. 5 and several of these matrices form a group of alpha/numeric symbols, i.e., numbers one to ten, and the signs for "plus" and "minus" in the present illustration.

Restating the problem, it is first necessary to emit a series of up to twenty-five intensification pulses onto a 5 x 5 spot area on cathode ray tube 20 to form desired numerals or symbols, and afterwards, to move the 5 x 5 spot area to another portion of the cathode ray tube, and repeat the operation.

In carrying the invention into practice, the engineers designing the system must draw symbolic logic diagrams for each symbol and dot. However, for the purpose of the present explanation unnecessary repetition will be avoided since to those skilled in the art, it will become readily apparent that the mathematical logic system used to intensify one particular dot or to form any particular geometric symbol is used for every other dot and symbol merely by using different logic diagrams and equations of the kind hereinafter described.

First, a logic table is prepared as in FIG. 5. This table is similar to Table 1 except that the BCD bits have been also designated as A, B, C, D, and a "dot number section" is also provided next to the BCD and decimal table. For example, from the "dot number section" it can be seen that number "4" is made of dots 1, 5, 6, 10, 11, 12, 13, 14, 15, 20 and 25, as shown in FIG. 5a, whereas the "plus" sign is made up of dots 3, 8, 11, 12, 13, 14, 15, 18, and 23 as shown in FIG. 5*b*. Informing these alpha/numeric symbols these dots must be intensified at the right time.

To solve the problem of devising the optimum gating circuitry in decoder circuit 36 so as to intensify the individual dots the designer can use a "4 bit" Karnaugh map, and this type of logic mathematics is explained in the book of Norman R. Scott, "Analog and Digital Computer Technology," McGraw Hill Book Co., Inc., 1960 edition, pages 283–286.

The particular Karnaugh map used in connection with the arrangement of Table 2 is shown in FIG. 6*a*.

The identification of the alpha/numeric symbols which make use of dot 1 using Table 2 on the Karnaugh map of FIG. 6*a* is shown in FIG. 6*b*. As can be seen from FIG. 6*c* the logic equation for dot 1 is $B\overline{D}+\overline{AB}+D\overline{B}+C$. A circuit corresponding to this equation is shown in FIG. 7. Furthermore, the equation must be properly triggered off at the first dot and for this purpose, a $P\times Q$ raster for the sequential enabling of horizontal and vertical lines of dots must be constructed in very much the same manner as the more complex dot raster. Thus, gates G–8 to G–10 corresponding to $2^0$ to $2^3$ admit signals labeled A, B, C, and D. These signals are also inverted in inverters I–1 to I–4 providing outputs corresponding to $\overline{A}$, $\overline{B}$, $\overline{C}$, $\overline{D}$. These outputs are then fed to AND gates G–12 to G–14 to perform the gating functions $B\overline{D}$; $\overline{AB}$; $D\overline{B}$.

Next, the outputs from gates G–12 to G–14 are fed to an OR gate OR–2 together with "C" which is also fed to the OR gate. The gate is triggered off at dot 1 by the input Q–1; P–1 from another logic circuit termed the DOT SEQUENCE GENERATOR and indicated in FIG. 3 by reference numeral 38. The design of this circuit is also based on a Karnaugh map, to accomplish the minor horizontal and vertical sequence. The minor horizontal and vertical gating signals developed from generator 38 in conjunction with decoder 36 form each symbol in the 25 dot block. Similarly a major horizontal and vertical deflection sequence is required to move the entire 25 dot block to various parts of the cathode ray tube 20 so as to form groups of different alpha/numeric symbols. Accordingly, the proper logic signals for the major horizontal and vertical deflection sequence are derived from the CHARACTER SEQUENCE LOGIC GENERATOR 46 of FIG. 3. The structural details of generators 38 and 46 which provide the logic signals necessary for the formation of blocks of dots and the movement of blocks of dots are fully explained in the aforesaid NAVY and USAF manual, and other literature.

It must be pointed out that second clock 40 (See FIG. 3) which times the dot sequence logic acts much more rapidly than the data pulses. This may be seen by FIG. 8 which repeats some of the waveforms shown in FIG. 3 and then expands the time scale of pulses $t_0$—$t_1$, forming the alpha/numeric symbols.

Alongside of the expanded time scale, are shown the clock pulses supplied to the dot sequence generator for timing, the 25 dot matrix sequence. In response to these timing signals, the dot sequence generator 38 will produce the necessary gating signals P–1, Q–1, . . . P–5, Q–5 required by decoder 36 to convert each BCD data line into its corresponding alpha/numeric character as explained in reference to FIG. 7. In so doing, generator 38 also supplies the necessary logic to the horizontal and vertical ladder circuits 42 and 44 which latter, in turn, position the various dots on the face of the CRO. Thus before the data pulses have traveled from pulse $t_0$ and reached pulse $T_1$, i.e., the seventh pulse (first negative pulse), the twenty-fifth dot pulse must have been supplied to the dot generator by the second clock means 40.

It is to be observed, therefore, that the present invention provides for a system of converting a stream of coded pulses formed by a staircase saw tooth wave into corresponding alpha/numeric symbols which are displayed in rectangular blocks made up of dots. Initially, reconversion means, i.e., capacitor 24, buffer and full wave rectifier 28, and a multivibrator "one shot" 30 reconverts the staircase saw tooth wave into a first set of clock pulses which are in sequence with the incoming stream of coded pulses. Further, a staircase saw tooth wave is also fed to amplitude discrimination means, i.e., capacitor 24 and discriminator 26, which is responsive only to the last downward step of the staircase; this amplitude discriminator sets a first flip-flop FF–1, while the first set of clock pulses clocks in the stream of coded pulses into a serial shift register. The data pulses enter an AND gate G–1 responsive also to the first flip-flop and from there are clocked into the shift register by the clock pulses. After a predetermined number of pulses, including an index pulse have entered the shift register, gate means enabled by the index pulse pass the remaining pulse signals to a storage register and the index pulse simultaneously enables a second flip-flop. Meanwhile, a dot sequence generator 38 has also been cleared by the first flip-flop. This dot sequence generator is coupled to a display panel or cathode ray tube 20, and produces display blocks made up of dots. This dot sequence generator will produce these dots during a time interval determined by a second clock corresponding to the time interval required for passage of the predetermined number of coded pulses. This second clock again passes the dot display signals when the second flip-flop is enabled. Responsive to storage register

34 is a decoder 36 including logic circuitry to decode the stored pulses into alpha/numeric symbols. The logic circuitry determines which dots in the blocks formed in the display panel by the dot sequence generator are to be intensifed so as to display the desired alpha/numeric symbol.

While the present invention has been described in a preferred embodiment, it will be obvious to those skilled in the art that various modifications can be made therein within the scope of the invention, and it is intended that the appended claims cover all such modifications.

What is claimed is:

1. A system for converting a stream of coded pulses into corresponding alpha/numeric symbols which are displayed in rectangular blocks made of dots, comprising in combination, conversion means for converting an incoming saw tooth wave into a first set of clock pulses in sequence with the incoming stream of coded pulses; amplitude discrimination means responsive to the incoming saw tooth wave to pass only waves of a certain amplitude; a serial shift register responsive to said amplitude discriminator and said first set of clock pulses to which is fed said coded pulses; gate means responsive to a predetermined one of said coded pulses to pass the pulses in the shift register; a dot sequence register; a second block pulse source supplying dot pulses to said dot sequence register in a time interval corresponding to the time required for the passage of a predetermined number of coded pulses; a decoder, said decoder including logic circuitry for receiving inputs both from said gate means and said dot sequence register to produce signals which determine which dots supplied by the dot sequence register are to be intensified; and, horizontal and vertical display control means responsive to said dot sequence register and said decoder to control the formation of at least one block of dots on display means which block of dots will have some dots so intensified as to form an alpha/numeric symbol, said conversion means including a capacitor receiving said staircase wave; full wave rectifier means fed by said capacitor; and a one-shot multi-vibrator triggered off by said rectifying means.

2. A system as claimed in claim 1, including a first flip-flop set by the ampltiude discriminator, and an AND gate responsive to said flip-flop and the incoming data stream passing said data stream to the serial shift register.

3. A system as claimed in claim 2, including a storage register fed by said gate means to store the information passed to the decoder.

4. A device as claimed in claim 3, including major and minor display control means to form a series of block of dots.

5. A data display system for displaying alpha/numeric characters being formed from a series of dots displayed on a cathode ray tube or the like, comprising:

means for generating a series of coded data pulses representing said alpha/numeric characters;

means for generating a first series of clock pulses;

shift register means responsive to said clock pulses for storing said data pulses one line at a time, wherein each of said data pulse lines represents a single alpha/numeric character;

parallel register means responsive to said shift register means for receiving each said line of coded data pulses and for storing said line of data pulses until the subsequent line of data pulses is loaded into said shift register means;

means for generating a second series of clock pulses;

dot generator means responsive to said second series of clock pulses for generating a raster of dots on said cathode ray tube in a predetermined sequence during the time interval required to load each of said data pulse lines into said shift register means, and decoder means responsive to each said line of coded data pulses stored in said parallel register means and being responsive to gating signals derived from said dot generator to generate signals to cause various ones of said dots in said raster to be intensified whereby said intensified dots in said raster form an alpha/numeric character corresponding to said line of data stored in said parallel register means.

6. The display system of claim 5 further comprising character sequence logic means responsive to said dot generator means for moving the position of said raster on said cathode ray tube whereby a series of alpha/numeric characters may be displayed thereon.

7. The display system of claim 5 further comprising flip-flop means responsive to a series of timing pulses for enabling said shift register means to commence loading of said data pulses therein.

8. The display system of claim 7 further comprising:
means for generating a staircase saw tooth waveform;
capacitor means responsive to said staircase saw tooth waveform for differentiation thereof;
amplitude discriminator means responsive to said differentiated waveform for deriving said series of timing pulses for enabling said flip-flop means, and
AND gate means responsive to said flip-flop means and said series of data pulses for enabling said shift register means.

9. The display apparatus of claim 8 further comprising:
rectifier means responsive to said differentiated waveform from said capacitor, and
wherein said means for generating said first series of clock pulses comprise a one-shot multi-vibrator responsive to said rectifier means.

10. The display system of claim 5 further comprising flip-flop means for enabling said second clock means in response to transfer of each said line of data pulses from said shift register means to said parallel register means.

11. The display apparatus of claim 10 wherein each said data pulse line comprises N bits and wherein said shift register has N stages and is responsive to each Nth bit in said respective data pulse lines for transfering said data line to said parallel register, and wherein said flip-flop means enables said second clock means in response to the loading of said Nth bit in said shift register.

12. The display system of claim 11 wherein said dot generator means is adapted to generate a raster comprising $P \times Q$ dots, and wherein said second series of clock pulses has a pulse repetition frequency equal to $$\frac{P \times Q}{N}$$

times the pulse repetition frequency of said first series of clock pulses.

References Cited

UNITED STATES PATENTS 3,423,749 1/1969 Newcomb ---------- 340—324
3,303,469 2/1967 Perotto ----------- 340—146.3

MAYNARD R. WILBUR, Primary Examiner

J. GLASSMAN, Assistant Examiner

U.S. Cl. X.R.

340—347